No. 769,688. PATENTED SEPT. 13, 1904.
J. CEDERSTROM.
VALVE CONNECTION FOR SODA WATER APPARATUS OR THE LIKE.
APPLICATION FILED DEC. 15, 1903.
NO MODEL.
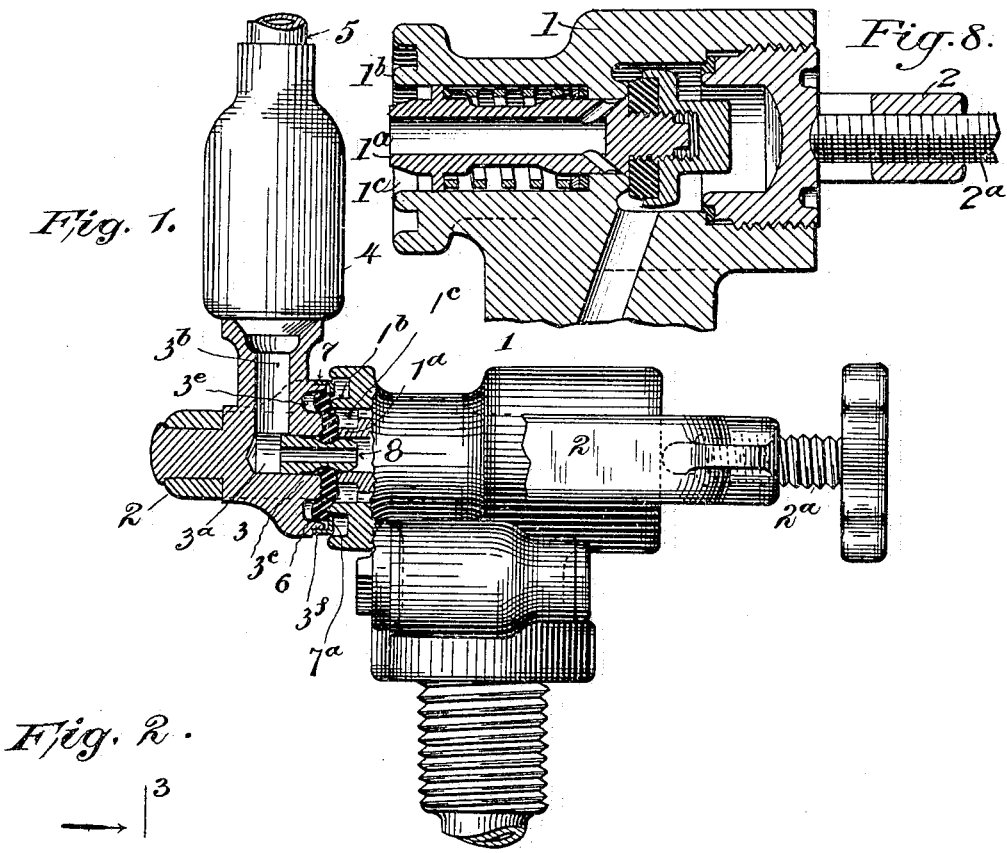
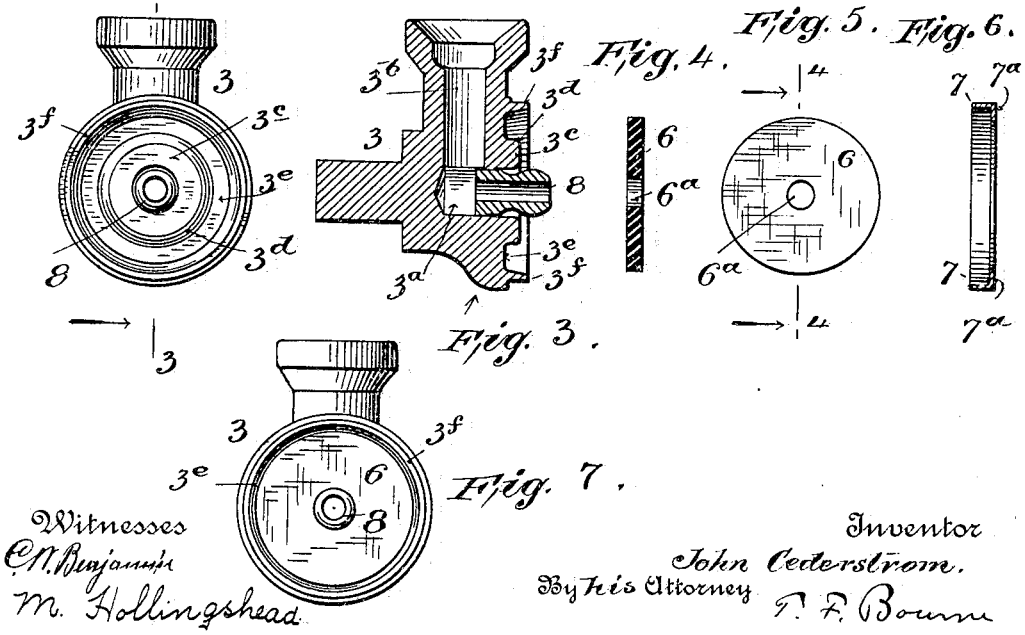
Witnesses
C. N. Benjamin
M. Hollingshead
Inventor
John Cederstrom.
By his Attorney
T. F. Bourne No. 769,688.  
Patented September 13, 1904.

UNITED STATES PATENT OFFICE.

JOHN CEDERSTROM, OF CHICAGO, ILLINOIS, ASSIGNOR TO JOHN MATTHEWS, A CORPORATION OF NEW YORK.

VALVE CONNECTION FOR SODA-WATER APPARATUS OR THE LIKE.

SPECIFICATION forming part of Letters Patent No. 769,688, dated September 13, 1904.

Application filed December 15, 1903. Serial No. 185,190. (No model.)

*To all whom it may concern:*

Be it known that I, JOHN CEDERSTROM, a citizen of the United States, residing in Chicago, Cook county, State of Illinois, have invented certain new and useful Improvements in Valve Connections for Soda-Water Apparatus or the Like, of which the following is a specification.

My invention relates to improvements in the connections provided between the house-piping and the cocks or valves on tanks or fountains containing soda-water or analogous aerated beverages under pressure; and the invention has for its object to permit the ready connection of such parts, while preventing the spilling of the liquid, which frequently occurs when such connections are being made with the ordinary connections now in use.

My invention comprises the novel details of improvement that will be more fully hereinafter set forth and then pointed out in the claims.

Reference is to be had to the accompanying drawings, forming part hereof, wherein—

Figure 1 is a side elevation, partly in section, of an apparatus embodying my invention. Fig. 2 is a face view of the coupling or connection containing my improvements. Fig. 3 is a section on the line 3 3 in Fig. 2. Figs. 4 and 5 are respectively a sectional and face view of the washer used with my improvements. Fig. 6 is a sectional view through the washer-holding ring or cap. Fig. 7 is a view similar to Fig. 2, showing the washer in position; and Fig. 8 is a sectional view of the cock.

Similar numerals of reference indicate corresponding parts in the several views.

In the drawings the numeral 1 indicates generally a cock or valve, such as usually carried upon portable soda-water tanks, and at 2 is a yoke or frame for clamping the valve-body 1 to the coupling 3. The coupling 3 is mainly of the ordinary type used for this purpose and is preferably made of cast metal provided with a bore $3^a$, which alines with the corresponding passage in the cock 1, and a passage $3^b$, communicating with the check-valve 4, that connects with the delivery or house pipe 5. On the side of the coupling 3 that faces the cock 1 and surrounding the bore $3^a$ is an annular rib or projection $3^c$, shown having its outer edge beveled at $3^d$, which rib is adapted to aline with the sliding member $1^a$ of cock 1, so as to push the same inwardly when the rib $3^c$ is pushed against said member. Surrounding the rib $3^c$ is an annular recess $3^e$, beyond which is an annular rim $3^f$. The diameter or distance across the face of the rim $3^c$ is less than the interior diameter of the annular rib $1^b$ on the cock 1, that surrounds the sliding member $1^a$, whereby the rib $3^c$ may enter the space $1^c$ within the rib $1^b$, the end of member $1^a$ and rib $1^b$ being normally substantially on the same plane.

At 6 is indicated a washer, preferably of rubber, provided with a central aperture $6^a$, which washer is adapted to fit over the face of the rib $3^c$ and project beyond the same across the annular space $3^e$, so as to simultaneously engage the end of sliding member $1^a$ and the rib $1^b$ of the cock, whereby the latter may press the washer toward or into recess $3^e$, as indicated in Fig. 1. This washer is preferably held upon coupling 3 by means of a flanged ring or cap 7, whose inwardly-projecting portion $7^a$ overlies the rim of the washer to keep the same in place and hold its aperture $6^a$ in line with the bore $3^a$. This flanged ring may be firmly fastened upon the outer surface of the flange $3^f$.

At 8 is indicated a nipple located within the bore $3^a$, the outer end of said nipple being of a proper size to fit within the bore of the sliding member $1^a$ to thereby serve as a guide when the cock is being applied to the coupling 3 and prevent the closure of the bore by compression of the washer, the bore of the nipple alining with the bore of the member $1^a$.

When the cock 1 is disconnected from the coupling 3, the spring in the cock will move the sliding member $1^a$ outwardly until its outer edge is about flush with the outer edge of rib $1^b$ in the usual manner. When the cock is placed in line with the coupling for making the desired connections, the nipple 8 will enter the bore in the sliding member $1^a$, and the front face of washer 6 will bear substantially simultaneously against the outer edges of the sliding member 1ª and the rib 1ᵇ of the cock, and then when the parts are pressed firmly together by means of the yoke 2 and its screw 2ª the rib 3ᶜ of the coupling presses the washer firmly against the member 1ª to make an immediate tight joint at the latter, and as the parts are pressed more closely together the rib 3ᶜ enters the space 1ᶜ and jams the washer 6 hard against the rib 1ᵇ. The effect of such construction and operation is that as the washer 6 is first brought to bear against the movable member 1ª the latter will be unseated by reason of the pressure of the washer upon it, and thereby an almost instantly tight joint is effected, so that as the valve in cock 1 is unseated by the sliding of member 1ª the liquid or gases under pressure will be kept from leaking from the bore of member 1ª past the washer during the operation of coupling the parts and at the same time making a temporary joint against rib 1ᵇ to keep liquid from leaking past the outer part of the sliding member 1ª, and when the parts are finally coupled the outer edge or bevel 3ᵈ of rib 3ᶜ jams the washer 6 hard against the rib 1ᵇ, thus making a complete and final closure.

My improvements are such as to overcome the disadvantages of the ordinary type of joint used in couplings of this class which permit the escape of liquid under pressure during the time that the sliding member 1ª is being pushed back and until the outer washer usually employed bears firmly against the rib of the cock surrounding such member. By having the transverse diameter of the rib 3ᶜ less than the internal diameter of the rib 1ᵇ and by having the washer 6 extend beyond the rib 3ᶜ in line with the rib 1ᵇ and capable of simultaneously engaging the parts 1ª and 1ᵇ the washer is firmly jammed in the space intervening between said ribs and may bend as required as the rib 3ᶜ seeks to enter the space 1ᶜ, thus producing permanently-tight joints.

While I have shown and described my invention as applicable to couplings for aerated beverages, it is obvious that it may be used in couplings for other purposes.

Having now described my invention, what I claim is—

1. In a device of the character described, the combination of a cock having a sliding member provided with a bore, and having a rib surrounding said member, with a coupling having a bore and provided with a rib surrounding said bore adapted to aline with said member, and a washer lying against said rib, said washer extending beyond said rib into alinement with said rib of the cock, substantially as described.

2. In a device of the character described, the combination of a cock having a sliding member provided with a bore, and having a rib surrounding said member providing a space between said member and rib, with a coupling having a bore and provided with a rib adapted to aline with said member, said rib being of less diameter than the diameter of the space within the rib on the cock, and a washer lying in front of the rib of the coupling adapted to bear on the sliding member, said washer extending into position to engage the rib on the cock, and arranged to be pressed into the space within the rib on the cock, substantially as described.

3. A coupling of the class described comprising a body having a bore and provided with a rib surrounding said bore adapted to press a movable member of a cock, a nipple within said bore projecting beyond said rib, and a washer having an opening fitting said nipple, said washer lying over the face of said rib, substantially as described.

JOHN CEDERSTROM.

Witnesses:
 CARL A. DYBERG,
 GEO. TRIPP.